United States Patent Office.

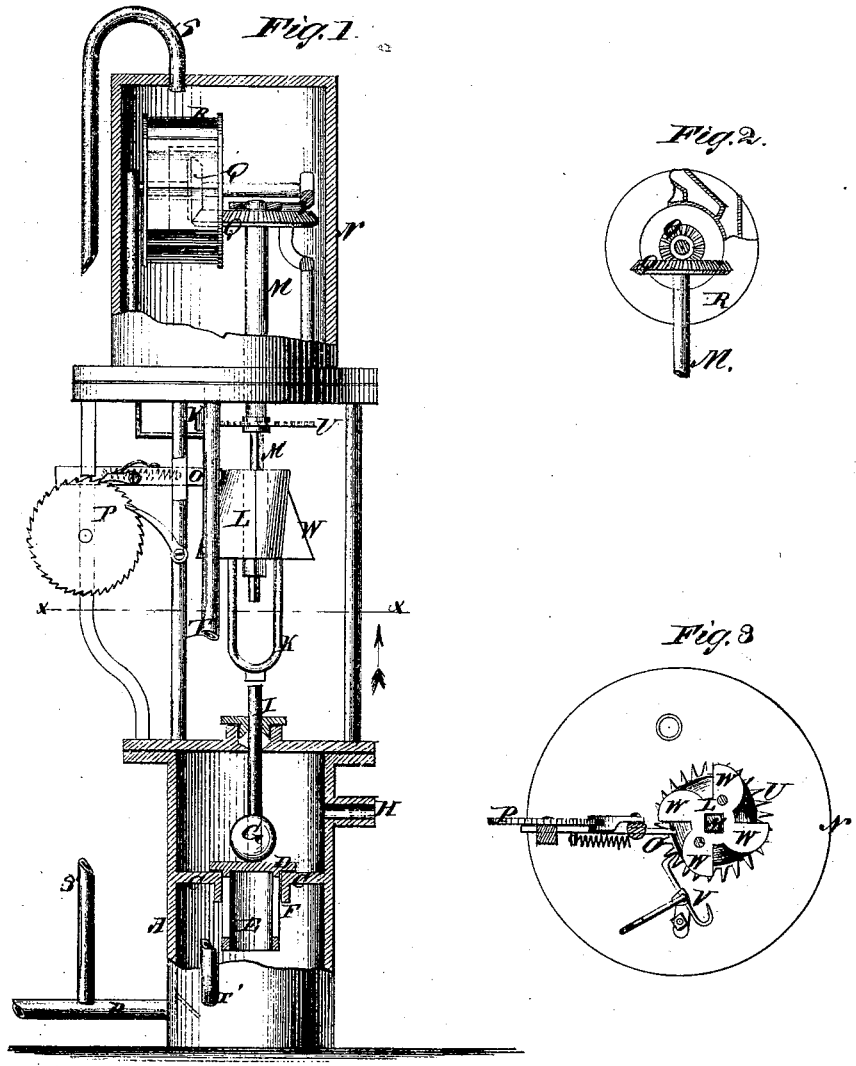

ANDREW MORSE, OF SKOWHEGAN, MAINE.

Letters Patent No. 106,852, dated August 30, 1870.

IMPROVEMENT IN WATER-METERS.

The Schedule referred to in these Letters Patent and making part of the same.

*To all whom it may concern:*

Be it known that I, ANDREW MORSE, of Skowhegan, in the county of Somerset and State of Maine, have invented a new and improved Water-Meter; and I do hereby declare that the following is a full, clear, and exact description thereof, which will enable others skilled in the art to make and use the same, reference being had to the accompanying drawing forming part of this specification.

This invention relates to improvements in water-meters, and consists in a combination with a weighted valve, to be raised by the water to be measured and the registering apparatus, of a graduated variable cam-block for operating the pawl of the registering apparatus, a water-wheel for turning the said cam to operate the pawl, and an escapement mechanism for regulating the motion of the water-wheel; all so arranged that the registering apparatus will be moved more or less, according to the amount of water passing through the said valve.

Figure 1 is a sectional elevation of a water-meter, constructed according to my invention;

Figure 2 is a detail of a part of the propelling apparatus for the cam; and

Figure 3 is a horizontal section on the line $x\,x$ of fig. 1.

Similar letters of reference indicate corresponding parts.

A is a hollow cylindrical or other formed sheet-metal vessel, into which the water to be measured is admitted by suitable pipes B.

C is a dividing plate therein, for the support of a valve, D, to be raised by the water.

This valve has a tubular extension, E, from the under side, passing down through the disk C, and below a flange, F, projecting downward from the under side.

The said tubular extension E of the valve has two vertical slots beginning at the under side of the top plate, and extending downward a suitable distance. They are arranged on opposite sides of the said projection, and are intended for the water to pass through when the valve is raised, to regulate the flow more evenly than would be the case if it was allowed to escape between the tubular projection and the flange F, where, in this arrangement, the joint is intended to be as nearly water-tight as may be without making too much friction.

The water escapes through the pipe H after passing through the valve.

The stem I rises up through a stuffing-box in the top of cylinder A, under a yoke, K, projecting downward from a conical cam-block, L, fitted to a vertical shaft, M, projecting downward from an air-chamber, N, above, the said block being so arranged as to slide up and down on the said shaft freely, and it is arranged to actuate the sliding pawl-bar O for working a ratchet-wheel, P, which is to be connected to the operating parts of any suitable indicator-scales for registering the quantity of water passing through the valve.

This shaft M is connected by gear-wheels Q, in the air-chamber, with the shaft of a small water-wheel, R, upon which the water is discharged from the pipe S, to obtain motion for turning the cam-block L.

After acting on the wheel, the water escapes through pipe T, or any other suitable connection with the supply-pipe B.

The compressed air in the chamber N prevents the wheel from being flooded so as to interfere with its working properly.

Below the air-chamber N an escapement-wheel, U, is attached to the shaft, and a pallet, V, and a suitable balance-wheel or pendulum are provided for regulating the motion of the water-wheel and cam-block L.

This cam-block is concentric at the top, which falls to the height of the bar O when the valve D is closed, and consequently will not work the bar although the wheel R may be kept in motion, but, as soon as the valve rises, the tapered tappets W of the block come in contact with it, and drive it forward, so that it will actuate the ratchet-wheel.

The said bar O is drawn back by a spring. As the valve opens further, the cam-block will rise in proportion, and the movement of the bar O will be correspondingly increased, thereby increasing the movements of the recording apparatus, the scales of which will be properly adjusted to the movements of the bar O and the cam to record the quantity of water passing through the valve, which will be very regular in consequence of the action of slots through which it passes and the weight on the valve.

It will be seen that by this arrangement the valve will be entirely disconnected from any such connection with the operating parts as to be affected in its movements by the friction thereof. Also, that the operating gears will not be subject to any material variations due to friction or other causes, both on account of the arrangement of the water-wheel in the chamber N, where it will be partly submerged by the water therein, which will act as a regulator, and because of the action of the escapement of the regulating apparatus.

This apparatus can all be inclosed in an air-chamber, with small thick glass cemented in the wall at proper places to note the index. In this case there will be no outside connection and less trouble from friction and leakage.

The air-chamber N and the gearing for turning the cam-block may be arranged in any other preferred way, and I do not limit myself to the arrangement of these parts herein shown.

I propose, in some cases, to dispense with the air-vessel, as it is only needed when it is desirable not to waste the water used to turn it. Its friction is the same either with or without the air-vessel.

Having thus described my invention,

I claim as new and desire to secure by Letters Patent—

1. The combination of the weighted valve D, of a water-supply pIipe, variable cam-block L, air-vessel N, water-wheel R, the escapement regulating apparatus, and the bar O of a registering apparatus, all arranged for operation substantially as specified.

2. The combination of the valve D, cam-block L, and pawl-bar O, substantially as specified.

ANDREW MORSE.

Witnesses:
HENRY LEAVITT,
J. D. BROWN.